United States Patent
Tarui et al.

(10) Patent No.: US 11,390,191 B2
(45) Date of Patent: Jul. 19, 2022

(54) VEHICLE SEAT CONTROL DEVICE

(71) Applicants: AISIN CORPORATION, Aichi (JP); TOYOTA JIDOSHA KABUSHIKI KAISHA, Toyota (JP)

(72) Inventors: Yasuko Tarui, Kariya (JP); Soichiro Hozumi, Nishio (JP); Shunsuke Tanaka, Nisshin (JP); Shinichiro Komaki, Toyota (JP)

(73) Assignees: AISIN CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 16/313,487

(22) PCT Filed: Jun. 29, 2017

(86) PCT No.: PCT/JP2017/023916
§ 371 (c)(1),
(2) Date: Dec. 27, 2018

(87) PCT Pub. No.: WO2018/008508
PCT Pub. Date: Jan. 11, 2018

(65) Prior Publication Data
US 2019/0193592 A1 Jun. 27, 2019

(30) Foreign Application Priority Data
Jul. 4, 2016 (JP) .............................. JP2016-132554

(51) Int. Cl.
*B60N 2/02* (2006.01)
*B60N 2/12* (2006.01)
(Continued)

(52) U.S. Cl.
CPC .............. *B60N 2/0248* (2013.01); *B60N 2/12* (2013.01); *B60N 2/18* (2013.01); *B60N 2/22* (2013.01);
(Continued)

(58) Field of Classification Search
CPC ........ B60N 2/0248; B60N 2/806; B60N 2/12; B60N 2/18; B60N 2/22; B60N 2002/0272
See application file for complete search history.

(56) References Cited

U.S. PATENT DOCUMENTS 5,187,665 A * 2/1993 Futami ................. B60N 2/0248
296/65.16
5,254,924 A * 10/1993 Ogasawara .......... B60N 2/0252
318/467
(Continued)

FOREIGN PATENT DOCUMENTS

JP   H05-330368 A   * 12/1993
JP   2011-68160 A   4/2011
JP   2014-159220 A  9/2014

OTHER PUBLICATIONS

Lexus LS Hybrid UVF4# Electronic Technical Manual (with English Translation), No. SCO5C8J, May 2007 (Year: 2007).*

(Continued)

*Primary Examiner* — Nadeem Odeh (74) *Attorney, Agent, or Firm* — Oblon, McClelland, Maier & Neustadt, L.L.P.

(57) ABSTRACT

This vehicle seat control device is provided with a storage unit, a position detection unit, a control unit, and an operation order setting unit. The space on a seat occupied by a passenger sitting in the seat is a sitting passenger-occupied space, and during the execution of an automatic operation, the operation order setting unit is configured to set the operation order such that position adjustments of seat elements operated in the direction of advancing into the sitting passenger-occupied space are started at the same time as, or are started after, the starting of the position adjustments of the seat elements operated in the direction moving away from the sitting passenger-occupied space.

7 Claims, 6 Drawing Sheets

(51) Int. Cl.
   *B60N 2/18* (2006.01)
   *B60N 2/22* (2006.01)
   *B60N 2/806* (2018.01)

(52) U.S. Cl.
   CPC ...... *B60N 2/806* (2018.02); *B60N 2002/0272* (2013.01)

(56) References Cited

U.S. PATENT DOCUMENTS

| | | | | |
|---|---|---|---|---|
| 9,434,255 | B2* | 9/2016 | Bendewald | B62D 15/00 |
| 10,046,671 | B2* | 8/2018 | Seiller | B60N 2/0248 |
| 10,059,232 | B2* | 8/2018 | Frye | B60N 2/0248 |
| 2012/0053794 | A1* | 3/2012 | Alcazar | B60N 2/0244 |
| | | | | 701/48 |
| 2012/0173089 | A1 | 7/2012 | Maeda et al. | |
| 2013/0062921 | A1* | 3/2013 | Meyer | B60N 2/5685 |
| | | | | 297/284.8 |
| 2014/0203611 | A1* | 7/2014 | Kondrad | B60N 2/0252 |
| | | | | 297/354.12 |
| 2016/0297337 | A1* | 10/2016 | White | B60N 2/2209 |
| 2017/0349061 | A1* | 12/2017 | Benson | B60N 2/914 |

OTHER PUBLICATIONS

Enlish Translation: Ogasawara, JP H05-330368 A, Dec. 1993, Japanese Patent Publication (Year: 1993).*

International Preliminary Report on Patentability and Written Opinion dated Aug. 22, 2017 in PCT/JP2017/023916 (submitting English translation only), 6 pages.

Lexus LS Hybrid UVF4# Electronic Technical Manual (with English translation), No. SC05C8J, May 2007, 11 pages.

* cited by examiner

VEHICLE SEAT CONTROL DEVICE

CROSS-REFERENCE TO RELATED APPLICATIONS

This application is a United States national stage application of International Application No. PCT/JP2017/023916, filed on Jun. 29, 2017, which designates the United States, and claims the benefit of foreign priority to Japanese Patent Application No. 2016-132554, filed on Jul. 4, 2016, and the entire contents of each of these applications are hereby incorporated herein by reference in entirety.

TECHNICAL FIELD

The present invention relates to a vehicle seat controller.

BACKGROUND ART

A vehicle seat controller controls the positions of seat elements such as a seat cushion and a seat back of which positions are adjustable by driving force from a driving source. Patent Document 1 and Non-Patent Document 1 disclose control devices that detect the position of each seat element when an operation input is performed on an operation switch and automatically move each seat element to a position corresponding to a predetermined seat position stored or held in a memory.

PRIOR ART DOCUMENT

Patent Document

Patent Document 1: Japanese Laid-Open Patent Publication No. 2011-68180

Non-Patent Document

Non-Patent Document 1: LEXUS LS Hybrid UVF4# Electronic Technical Manual, May of 2007, No. SC05C8J

SUMMARY OF THE INVENTION

Problems that are to be Solved by the Invention

When a vehicle occupant is seated on a seat and a controller performs an automatic operation, the vehicle occupant may be forced into an uncomfortable posture depending on the order in which the seat elements are moved. Thus, the order in which the seat elements are operated needs to be optimized so that the vehicle occupant is not forced into an uncomfortable posture.

It is an object of the present invention to provide a vehicle seat controller that avoids a situation in which the vehicle occupant is forced into an uncomfortable posture when the automatic operation is performed.

Means for Solving the Problem

A vehicle seat controller that achieves the object includes a storage unit that stores a predetermined seat position that is a position of a seat set in advance; a position detection unit configured to detect positions of a plurality of seat elements of which positions are adjusted by a driving force from a driving source; a control unit configured to perform an automatic operation to automatically adjust the position of each of the seat elements so that each of the seat elements is moved to a position corresponding to the predetermined seat position when predetermined conditions are satisfied; and an operation order setting unit configured to set an operation order for the seat elements in a case where the control unit adjusts the positions of the seat elements in the automatic operation. A region on the seat occupied by a vehicle occupant seated on the seat is referred to as a seated vehicle occupant occupying region. The operation order setting unit is configured to set the operation order so that position adjustment of one of the seat elements moved in a direction extending into the seated vehicle occupant occupying region starts simultaneously with or after position adjustment of one of the seat elements moved in a direction extending away from the seated vehicle occupant occupying region when the automatic operation is performed.

EMBODIMENTS OF THE INVENTION

One embodiment of a vehicle seat controller will now be described with reference to the drawings.

Figure 1:
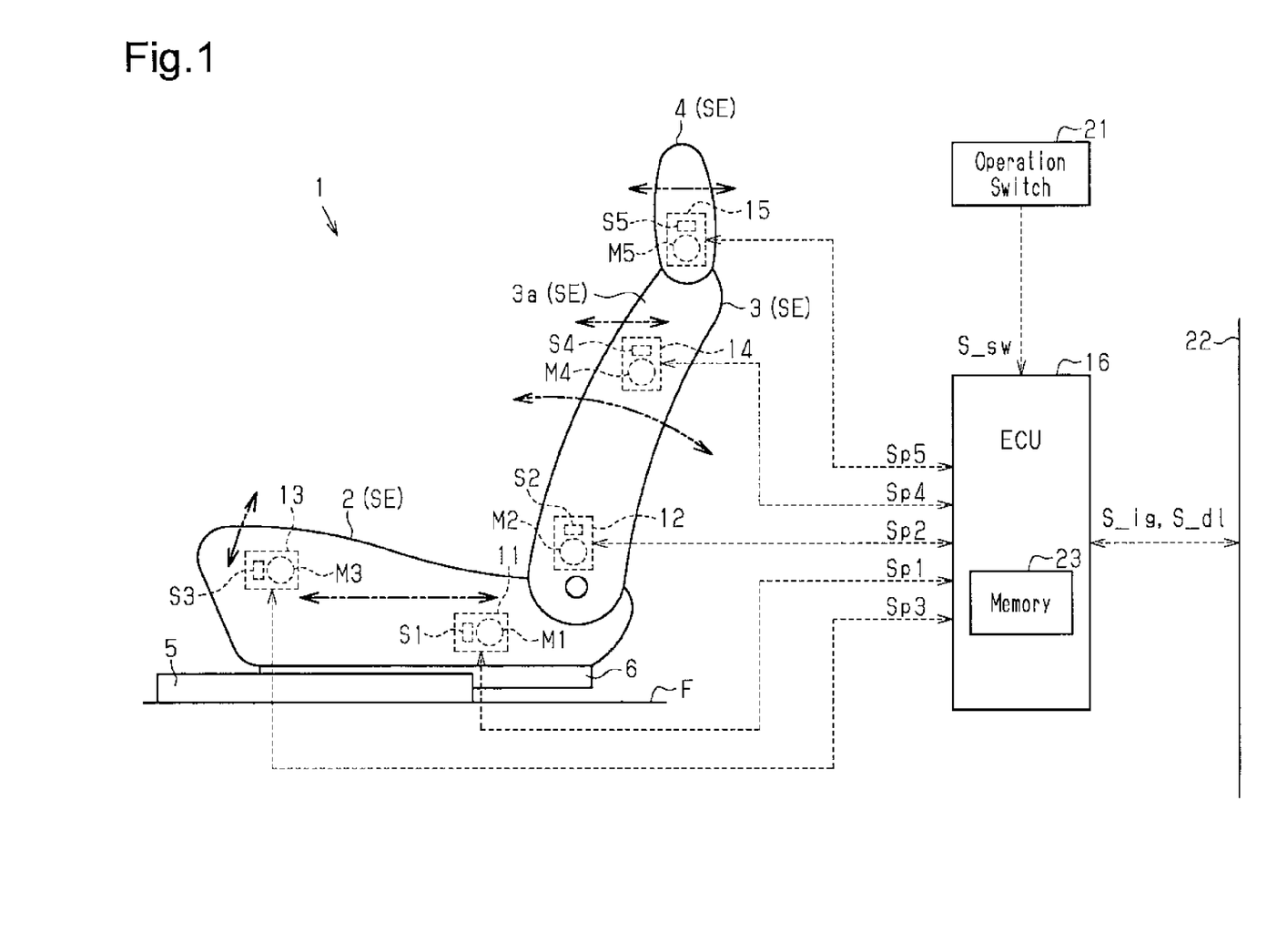
FIG. 1 is a schematic diagram showing the structure of a vehicle seat controller.

As shown in FIG. 1, a seat 1 includes a plurality of seat elements SE, namely, a seat cushion 2, a seat back 3 arranged to be tiltable relative to the rear end of the seat cushion 2, shoulder supports 3a arranged at the shoulder portion of the seat back 3, and a headrest 4 arranged at the upper end of the seat back 3. Two lower rails 5 extending in the vehicle front-rear direction are arranged in parallel on the floor F of a vehicle. Upper rails 6, each movable in the vehicle front-rear direction on the lower rails 5, are attached to the lower rails 5. The seat cushion 2 is supported on the upper rails 6 and is movable together with the upper rails 6 in the vehicle front-rear direction on the lower rails 5. In other words, the seat cushion 2 is configured to slide in the vehicle front-rear direction relative to the lower rails 5.

The seat 1 includes a seat slide actuator 11, a seat reclining actuator 12, a seat tilt actuator 13, a shoulder support actuator 14, a headrest actuator 15, and an ECU 16 serving as a control unit that controls actuation of the actuators 11 to 15. The seat 1 is configured as a power seat that allows for adjustment of the positions (or orientations) of the seat elements SE with the actuators 11 to 15.

Specifically, the seat slide actuator 11, which includes a motor M1 serving as a driving source, moves the seat cushion 2 to slide in the front-rear direction (right and left directions in FIG. 1) of the vehicle. This allows for adjustment of the position of the seat 1 in the front-rear direction of the vehicle.

The seat reclining actuator 12, which includes a motor M2 serving as a driving source, performs a reclining operation (tilting in the right and left directions in FIG. 1) with the seat back 3 such that the position of the upper end of the seat back 3 moves in the front-rear direction of the vehicle. This allows for adjustment of the position (reclining position) of the seat back 3.

The seat tilt actuator 13, which includes a motor M3 serving as a driving source, performs a tilting operation (tilting in the vertical direction in FIG. 1) with the front end or the entire portion of the seat cushion 2 such that the position of the front end of the seat cushion 2 is moved in the vertical direction of the vehicle. This allows for adjustment of the position (tilting position) of the seat cushion 2.

The shoulder support actuator 14, which includes a motor M4 serving as a driving source, performs a front-rear operation (straight movement in the right and left directions in FIG. 1) with the shoulder supports 3a such that the shoulder supports 3a (surface portion of the seat back 3) move in the front-rear direction of the vehicle. This allows for adjustment of the positions (front-rear position) of the shoulder supports 3a.

The headrest actuator 15, which includes a motor M5 serving as a driving source, performs a front-rear operation (straight movement in the right and left directions in FIG. 1) with the headrest 4 such that the entire portion or the front surface of the headrest 4 moves in the front-rear direction of the vehicle. This allows for adjustment of the position (front-rear position) of the headrest 4.

The ECU 16 is connected to the motors M1 to M5. The ECU 16 supplies driving power to the motors M1 to M5 and actuates the actuators 11 to 15 to control the positions (or orientations) of the seat elements SE (seat cushion 2, seat back 3, shoulder supports 3a, and headrest 4).

Specifically, the motors M1 to M5 include rotation sensors S1 to S5 that output pulse signals synchronized with the rotation of the corresponding motors M1 to M5. In other words, pulse signals Sp1 to Sp5 output by the rotation sensors S1 to S5 serving as position sensors are synchronized with the operation of the seat elements SE driven by the actuators 11 to 15. The ECU 16 counts or accumulates pulse changes of the pulse signals Sp1 to Sp5 based on preset initial values to detect the positions of the seat elements SE. In other words, the ECU 16 and the rotation sensors S1 to S5 function as position detection units in the present embodiment.

A plurality of operation switches 21 for adjusting the positions of the seat elements SE are arranged on the side or the like of the seat 1. An operation input signal S_sw corresponding to an operation input performed in the operation switches 21 is input to the ECU 16. Further, various types of signals such as an ignition signal S_ig and a door lock signal S_dl are input to the ECU 16 via an in-vehicle network 22. The ECU 16 controls the positions of the seat elements SE based on various types of input signals.

The ECU 16 may be configured as a circuit that includes 1) one or more dedicated hardware circuits such as ASICs, 2) one or more processors operating in accordance with a computer program (software), or 3) a combination of one or more hardware circuits and one or more processors. The processors include a CPU and a memory such as a RAM and a ROM. The memory stores a program code or instructions configured so that the CPU executes a process. The memory, namely, a computer-readable medium includes any available media accessible from a versatile or dedicated computer.

Automatic Operation Control

A memory 23 serving as a storage unit of the ECU 16 stores or holds one or plural predetermined seat positions (or predetermined seat orientations) as positions (orientations) of the seat 1 determined in advance. The predetermined seat positions include, for example, an exit position set in advance as a position allowing a vehicle occupant to easily exit the vehicle and a registered position registered in accordance with the preference of the user. The ECU 16 performs an automatic operation (automatic operation control) to automatically adjust the position of each seat element SE such that the seat element SE is moved to a position corresponding to a predetermined seat position if predetermined conditions are satisfied for the predetermined seat position. The predetermined conditions include a case in which an operation input is performed on the operation switches 21 to perform the automatic operation and a case in which the ignition signal S_ig indicates that the ignition switch is off and the door lock signal S_dl indicates that the door lock is unlocked.

If the automatic operation is performed to move the seat elements SE when the vehicle occupant is seated on the seat 1, the vehicle occupant may be forced into an uncomfortable posture depending on the order in which the seat elements SE are moved. In this respect, when adjusting the positions of the seat elements SE, the ECU 16 of the present embodiment adjusts the position of each seat element SE by setting an operation order for the seat elements SE and then controls each of the actuators 11 to 15 so that the vehicle occupant is not forced into an uncomfortable posture. In other words, the ECU 16 in the present embodiment functions as an operation order setting unit.

Figure 2:
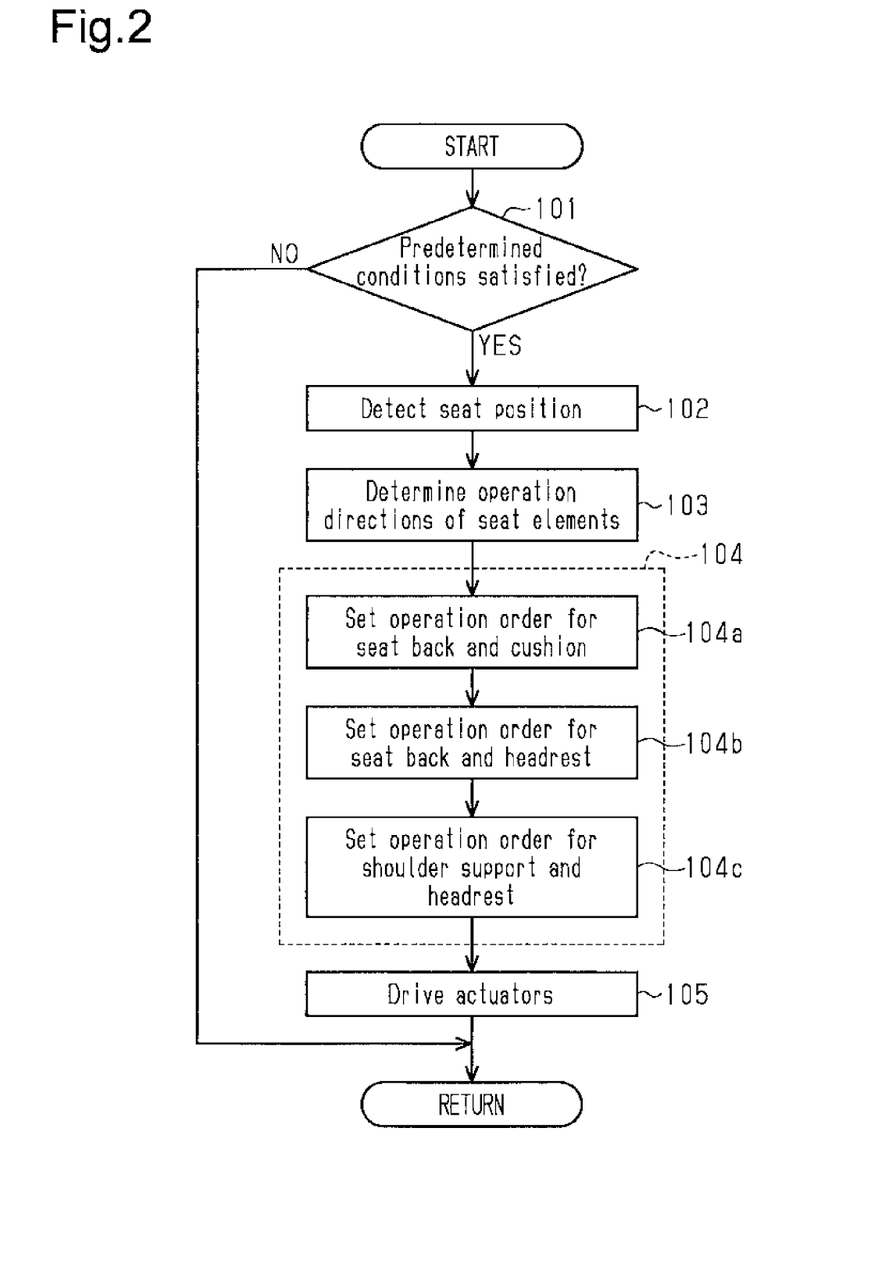
FIG. 2 is a flowchart showing a processing procedure of an automatic operation control.

Specifically, as shown in the flowchart in FIG. 2, if the predetermined conditions are satisfied (step 101: YES) as a result of an operation input or the like performed on the operation switch 21 by the vehicle occupant, the ECU 16 detects the positions of the seat elements SE based on the pulse signals Sp1 to Sp5 at the point in time at which the predetermined conditions are satisfied (step 102). Then, to adjust the seat 1 at the seat position corresponding to the satisfied predetermined conditions, the ECU 16 determines the seat elements SE of which positions need to be adjusted and the operation directions (movement directions) of such seat elements SE (step 103). Then, the ECU 16 sets an operation order of the seat elements SE (step 104) and drives the actuators 11 to 15 in the operation order set in step 104 to perform an automatic operation (step 105). If the predetermined conditions for any one of the predetermined seat positions are not satisfied (step 101: NO), the ECU 16 does not perform the processes of steps 102 to 105.

Operation Order of Seat Elements

A region of the seat 1 occupied by the vehicle occupant seated on the seat 1 is referred to as a seated vehicle occupant occupying region 31 (see FIGS. 3 to 5). When the ECU 16 performs position adjustment of the seat elements SE in the automatic operation, the ECU 16 starts adjusting the positions of the seat elements SE that are moved in a direction extending away from the seated vehicle occupant occupying region 31 of the seat 1 in the seat position taken at the point in time at which the predetermined conditions were satisfied before adjusting the positions of the other seat elements. After the ECU 16 adjusts the positions of the seat elements SE, that is, after completing the position adjustment of the seat elements SE, the ECU 16 starts adjusting the positions of the seat elements SE that are actuated in the seated vehicle occupant occupying region 31 at the seat position taken at the point in time at which the predetermined conditions were satisfied. The seated vehicle occupant occupying region 31 is the region frontward from and upward from the seat 1 occupied by the vehicle occupant seated on the seat 1 and is changed in accordance with the positions of the seat elements SE. In the present embodiment, the seated vehicle occupant occupying region 31 is a region set within a predetermined distance from the surface (surface of contact between seat 1 and vehicle occupant) of the seat 1 and corresponds to the thickness of the human body (about 20 cm, for example, regardless of the positions of the seat elements SE). Further, the seated vehicle occupant occupying region 31 is schematically shown by hatching lines in the drawings to facilitate illustration.

Figure 3A:
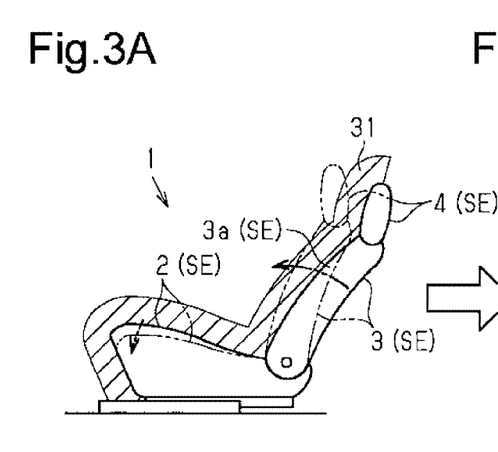
FIGS. 3A to 3F are schematic diagrams showing a seat when adjusting the positions of a seat back and a seat cushion in the automatic operation control.
Figure 3B:
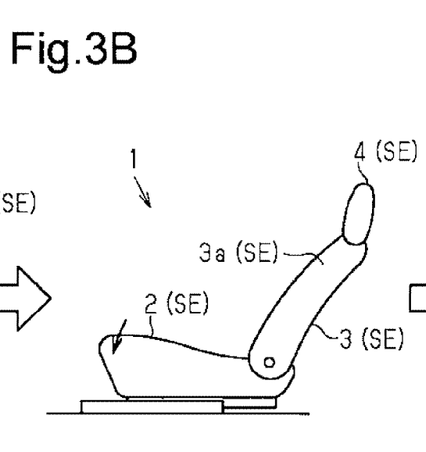
Figure 3C:
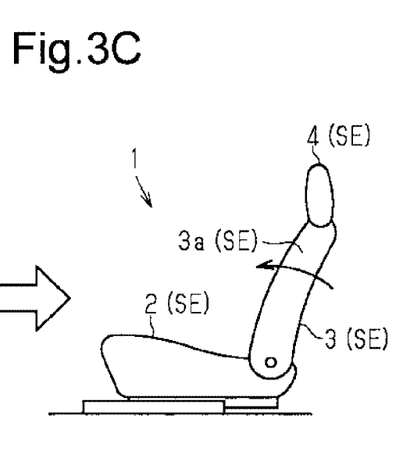

Specifically, when the ECU 16 adjusts the position of the seat back 3 in the frontward direction and the position of the seat cushion 2 in the downward direction, the ECU 16 will adjust the position of the seat cushion 2 in the downward direction and then adjust the position of the seat back 3 in the frontward direction. In other words, the ECU 16 will move the seat cushion 2 in the downward direction (downward movement) and then move the seat back 3 in the frontward direction (frontward movement). If the predetermined conditions are satisfied at, for example, the seat position shown in FIG. 3A and the ECU 16 adjusts the position of the seat 1 to the predetermined seat position shown in FIG. 3C, the ECU 16 will move the seat back 3 frontward and the seat cushion 2 downward as shown by the double-dashed lines in FIG. 3A. In other words, as shown in FIG. 3A, the seat back 3 is a seat element SE moved in a direction extending into the seated vehicle occupant occupying region 31, and the seat cushion 2 is a seat element SE moved in a direction extending away from the seated vehicle occupant occupying region 31. Thus, the ECU 16 moves the seat cushion 2 downward as shown in FIG. 3B and then moves the seat back 3 frontward as shown in FIG. 3C.

Figure 3D:
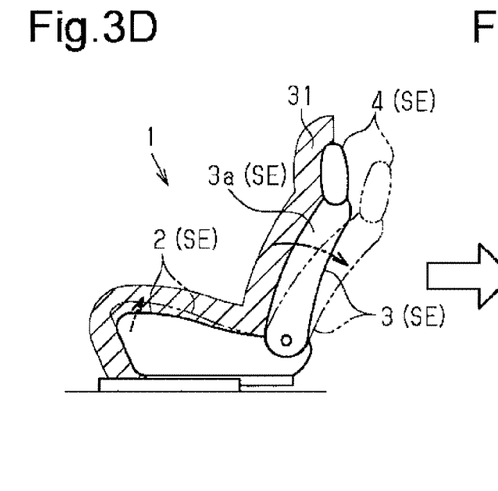
Figure 3E:
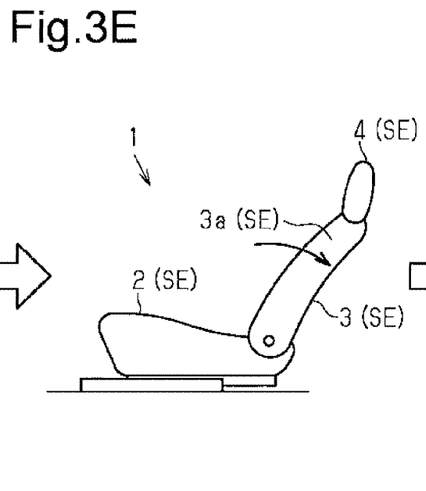
Figure 3F:
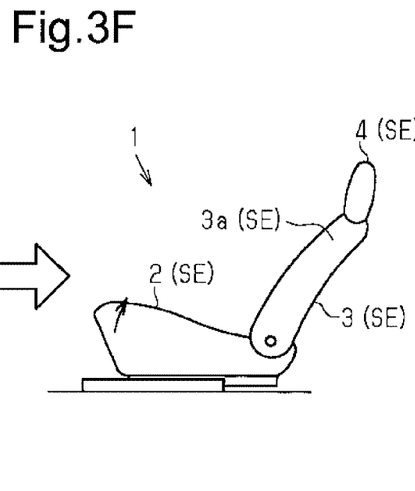

When the ECU 16 adjusts the position of the seat back 3 in the rearward direction and the position of the seat cushion 2 in the upward direction, the ECU 16 will adjust the position of the seat back 3 in the rearward direction and then adjust the position of the seat cushion 2 in the upward direction. In other words, the ECU 16 will move the seat back 3 in the rearward direction (rearward movement) and then move the seat cushion 2 in the upward direction (upward movement). If the predetermined conditions are satisfied at, for example, the seat position shown in FIG. 3D and the ECU 16 adjusts the position of the seat 1 to the predetermined seat position shown in FIG. 3F, the ECU 16 will move the seat back 3 rearward and the seat cushion 2 upward as shown by the double-dashed lines in FIG. 3D. In other words, as shown in FIG. 3D, the seat back 3 is a seat element SE moved in a direction extending away from the seated vehicle occupant occupying region 31, and the seat cushion 2 is a seat element SE moved in a direction extending into the seated vehicle occupant occupying region 31. Thus, the ECU 16 moves the seat back 3 rearward as shown in FIG. 3E and then moves the seat cushion 2 upward as shown in FIG. 3F.

When the ECU 16 adjusts the position of the seat cushion 2 and the position of the seat back 3 in a combination of directions differing from those described above, that is, when the ECU 16 moves the seat back 3 frontward and the seat cushion 2 upward or when the ECU 16 adjusts the seat back 3 rearward and the seat cushion 2 downward, the ECU 16 does not set the operation order and performs the position adjustment in an appropriate operation order.

Figure 4A:
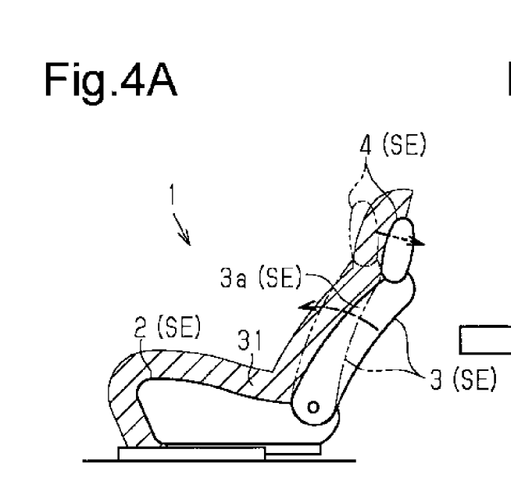
FIGS. 4A to 4F are schematic diagrams showing the seat when adjusting the positions of the seat back and a headrest in the automatic operation control.
Figure 4B:
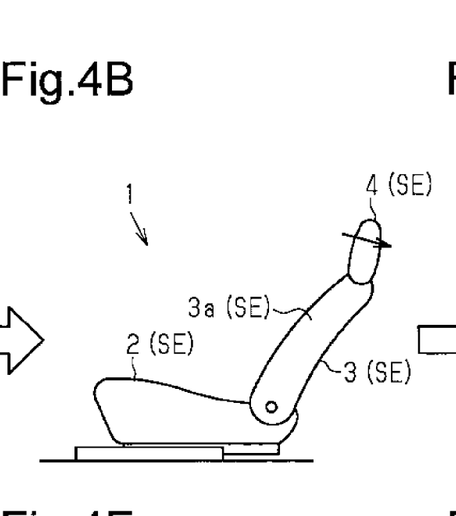
Figure 4C:
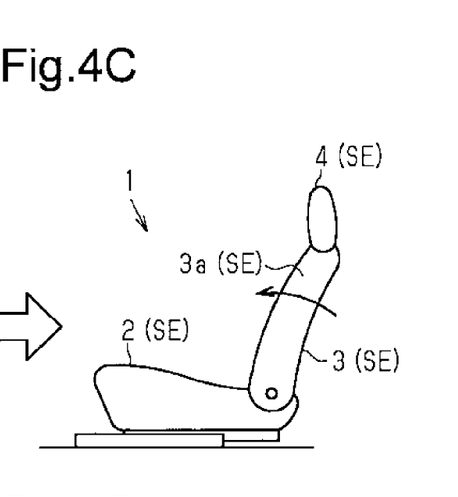

When the ECU 16 adjusts the position of the seat back 3 in the frontward direction and the position of the headrest 4 in the rearward direction, the ECU 16 will adjust the position of the headrest 4 in the rearward direction and then adjust the position of the seat back 3 in the frontward direction. In other words, the ECU 16 will move the headrest 4 rearward (rearward movement) and then move the seat back 3 frontward (frontward movement). If the predetermined conditions are satisfied at, for example, the seat position shown in FIG. 4A and the ECU 16 adjusts the position of the seat 1 to the predetermined seat position shown in FIG. 4C, the ECU 16 will move the seat back 3 frontward and the headrest 4 rearward as shown by the double-dashed lines in FIG. 4A. In other words, as shown in FIG. 4A, the seat back 3 is a seat element SE moved in a direction extending into the seated vehicle occupant occupying region 31, and the headrest 4 is a seat element SE moved in a direction extending away from the seated vehicle occupant occupying region 31. Thus, the ECU 16 moves the headrest 4 rearward as shown in FIG. 4B and then moves the seat back 3 frontward as shown in FIG. 4C.

Figure 4D:
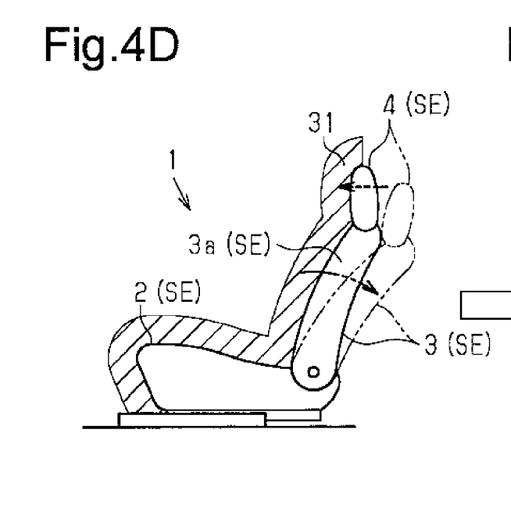
Figure 4E:
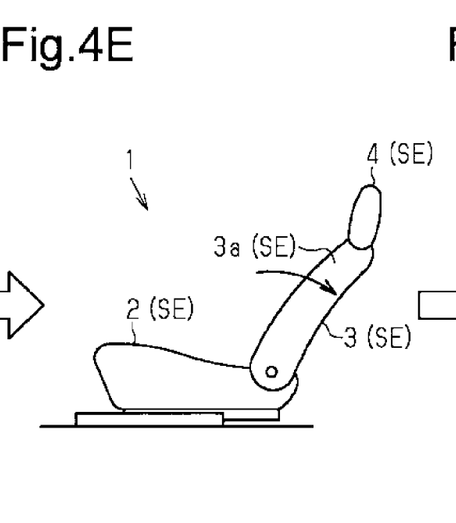
Figure 4F:
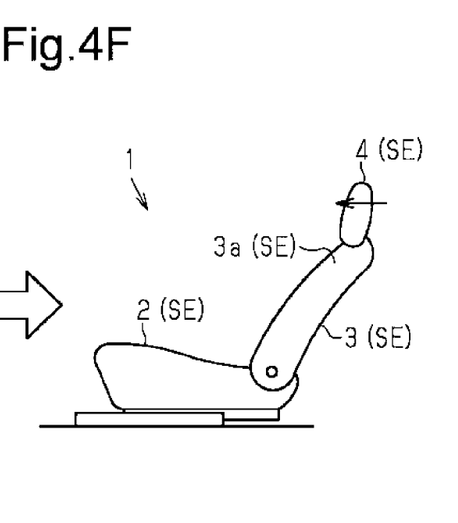

When the ECU 16 adjusts the position of the seat back 3 in the rearward direction and the position of the headrest 4 in the frontward direction, the ECU 16 will adjust the position of the seat back 3 in the rearward direction and then adjust the position of the headrest 4 in the frontward direction. In other words, the ECU 16 will move the seat back 3 rearward (rearward movement) and then move the headrest 4 frontward (frontward movement). If the predetermined conditions are satisfied at, for example, the seat position shown in FIG. 4D and the ECU 16 adjusts the position of the seat 1 to the predetermined seat position shown in FIG. 4F, the ECU 16 will move the seat back 3 rearward and the headrest 4 frontward as shown by the double-dashed lines in FIG. 4D. In other words, as shown in FIG. 4D, the seat back 3 is a seat element SE moved in a direction extending away from the seated vehicle occupant occupying region 31, and the headrest 4 is a seat element SE moved in a direction extending into the seated vehicle occupant occupying region 31. Thus, the ECU 16 moves the seat back 3 rearward as shown in FIG. 4E and then moves the headrest 4 frontward as shown in FIG. 4F.

When the ECU 16 adjusts the position of the seat back 3 and the position of the headrest 4 in a combination of directions differing from those described above, that is, when the ECU 16 moves the seat back 3 frontward and the headrest 4 frontward or when the ECU 16 moves the seat back 3 rearward and the headrest 4 rearward, the ECU 16 does not set the operation order and performs the position adjustment in an appropriate operation order.

Figure 5A:
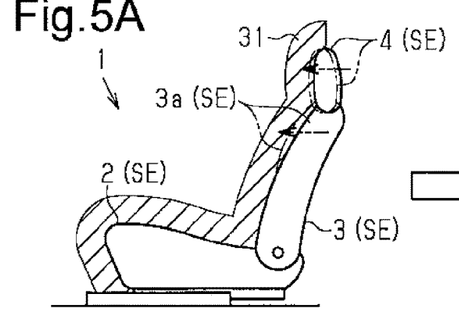
FIGS. 5A to 5D are schematic diagrams showing the seat when adjusting the positions of shoulder supports and the headrest in the automatic operation control.
Figure 5B:
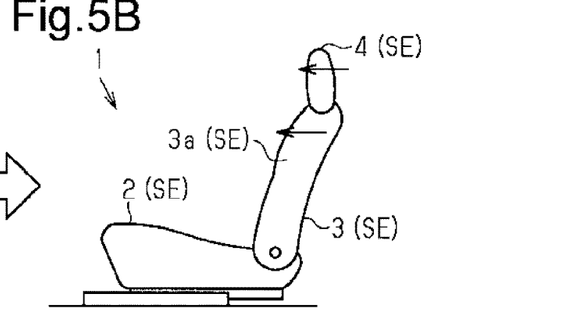

When the ECU 16 adjusts the positions of the shoulder supports 3a in the frontward direction and the position of the headrest 4 in the frontward direction, the ECU 16 will start adjusting the positions of the shoulder supports 3a and the headrest 4 in the frontward direction at substantially the same time. In other words, the ECU 16 will move the shoulder supports 3a and the headrest 4 frontward (frontward movement) at substantially the same time. If the predetermined conditions are satisfied at, for example, the seat position shown in FIG. 5A and the ECU 16 adjusts the position of the seat 1 to the predetermined seat position shown in FIG. 5B, the ECU 16 will move the shoulder supports 3a and the headrest 4 frontward as shown by the double-dashed lines in FIG. 5A. In this case, as shown in FIG. 5A, the shoulder supports 3a and the headrest 4 are seat elements SE moved in a direction extending into the seated vehicle occupant occupying region 31. Further, as shown in FIG. 5B, the ECU 16 will start moving the shoulder supports 3a and the headrest 4 frontward at substantially the same time.

Figure 5C:
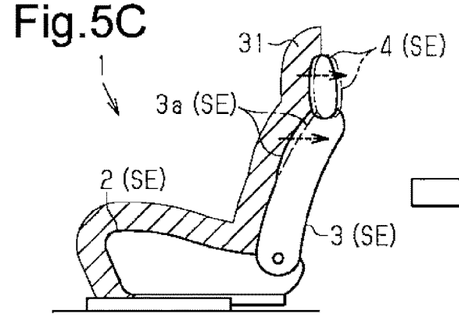
Figure 5D:
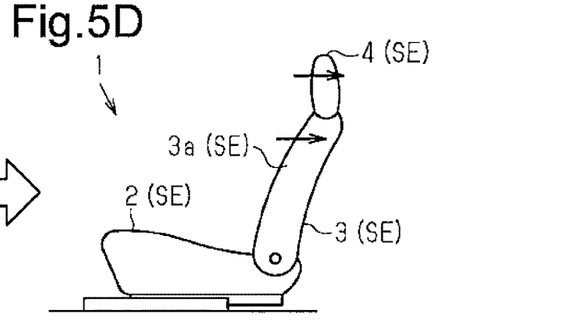

When the ECU 16 adjusts the positions of the shoulder supports 3a in the rearward direction and the position of the headrest 4 in the rearward direction, the ECU 16 will start adjusting the positions of the shoulder supports 3a and the headrest 4 in the rearward direction at substantially the same time. In other words, the ECU 16 will move the shoulder supports 3a and the headrest 4 rearward (rearward movement) at substantially the same time. If the predetermined conditions are satisfied at, for example, the seat position shown in FIG. 5C and the ECU 16 adjusts the position of the seat 1 to the predetermined seat position shown in FIG. 5D, the ECU 16 will move the shoulder supports 3a and the headrest 4 rearward as shown by the double-dashed lines in FIG. 5C. In this case, as shown in FIG. 5C, the shoulder supports 3a and the headrest 4 are seat elements SE moved in a direction extending away from the seated vehicle occupant occupying region 31. Further, as shown in FIG. 5D, the ECU 16 will start moving the shoulder supports 3a and the headrest 4 rearward at substantially the same time.

When the ECU 16 adjusts the positions of the shoulder supports 3a and the position of the headrest 4 in a combination of directions differing from those described above, that is, when the ECU 16 moves the shoulder supports 3a frontward and the headrest 4 rearward or when the ECU 16 adjusts the shoulder support 3a rearward and the headrest 4 frontward, the ECU 16 does not set the operation order and performs the position adjustment in an appropriate operation order.

The ECU 16 combines the above operation orders to move three or more seat elements SE. In other words, when, for example, the ECU 16 moves the seat back 3 frontward, the headrest 4 rearward, and the seat cushion 2 downward, the ECU 16 does not set the order of position adjustment for the headrest 4 and the seat cushion 2. However, the ECU 16 moves the headrest 4 rearward and the seat cushion 2 downward before moving the seat back 3 frontward. Further, when, for example, the ECU 16 adjusts the positions of the seat back 3 frontward, the headrest 4 rearward, and the shoulder supports 3a rearward, the ECU 16 moves the shoulder supports 3a and the headrest 4 rearward at substantially the same time before moving the seat back 3 frontward.

A procedure performed by the ECU 16 to determine the operation order of the seat elements SE will now be described.

As shown in FIG. 2, the ECU 16 sets an operation order in step 104. Specifically, the ECU 16 sets an operation order to adjust the positions of the seat back 3 and the seat cushion 2 (step 104a). The ECU 16 then sets an operation order to adjust the positions of the seat back 3 and the headrest 4 (step 104b) and then sets an operation order to adjust the positions of the shoulder supports 3a and the headrest 4 (step 104c).

A procedure for processing the operation order setting for the seat cushion 2 and the seat back 3 will now be described.

Figure 6:
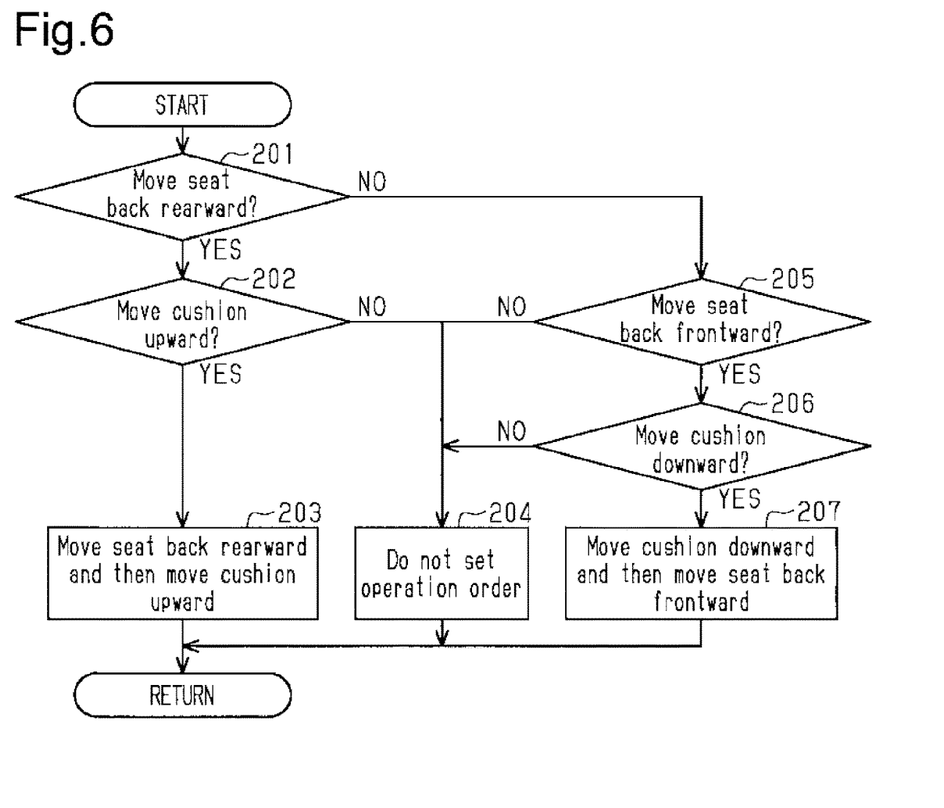
FIG. 6 is a flowchart showing a processing procedure for setting an operation order of the seat back and the seat cushion.

As shown in FIG. 6, the ECU 16 determines whether or not to move the seat back 3 rearward based on the operation directions of the seat elements determined in step 103 (step 201). If the ECU 16 moves the seat back 3 rearward (step 201: YES), the ECU 16 determines whether or not to move the seat cushion 2 upward (step 202). If the ECU 16 moves the seat cushion 2 upward (step 202: YES), the ECU 16 sets an operation order that moves the seat back 3 rearward and then moves the seat cushion 2 upward (step 203). If the ECU 16 does not move the seat cushion 2 upward (step 202: NO), the ECU 16 does not set the operation order for the seat back 3 and the seat cushion 2 (step 204).

If the ECU 16 does not move the seat back 3 rearward (step 201: NO), the ECU 16 determines whether or not to move the seat back 3 frontward (step 205). If the ECU 16 moves the seat back 3 frontward (step 205: YES), the ECU 16 determines whether or not to move the seat cushion 2 downward (step 206). If the ECU 16 moves the seat cushion 2 downward (step 206: YES), the ECU 16 sets an operation order that moves the seat cushion 2 downward and then moves the seat back 3 frontward (step 207). If the ECU 16 does not move the seat back 3 frontward (step 205: NO) or if the ECU 16 does not move the seat cushion 2 downward (step 206: NO), the ECU 16 proceeds to step 204 and ends the determination process without setting the operation order.

A procedure for processing the operation order setting for the seat back 3 and the headrest 4 will now be described.

Figure 7:
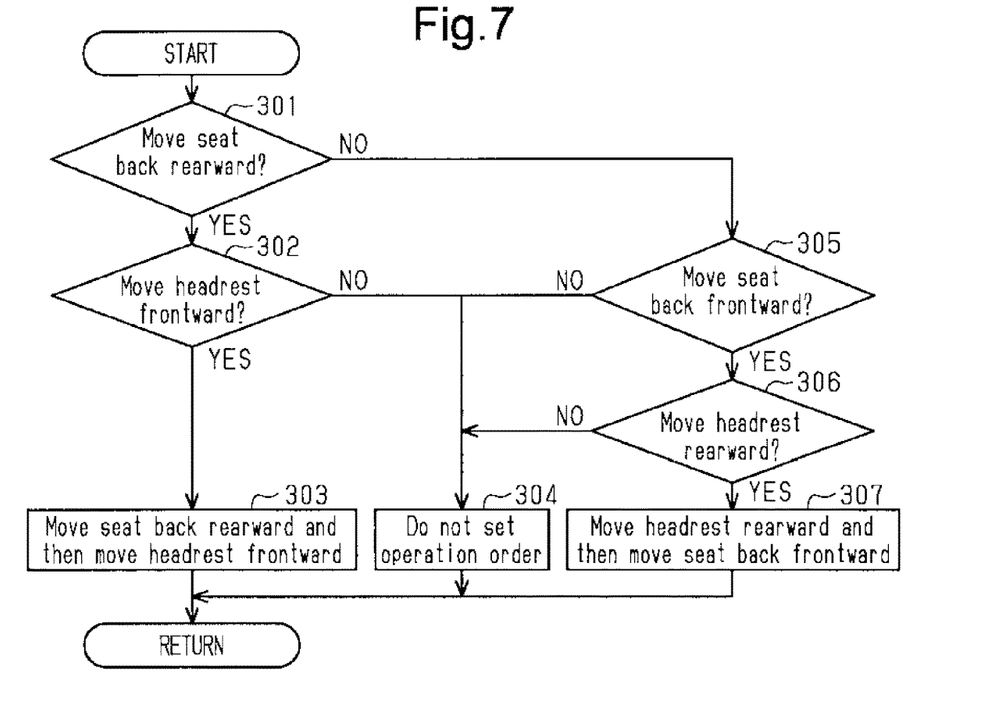
FIG. 7 is a flowchart showing a processing procedure for setting an operation order of the seat back and the headrest.

As shown in FIG. 7, the ECU 16 determines whether or not to move the seat back 3 rearward based on the operation directions of the seat elements determined in step 103 (step 301). If the ECU 16 moves the seat back 3 rearward (step 301: YES), the ECU 16 determines whether or not to move the headrest 4 frontward (step 302). If the ECU 16 moves the headrest 4 frontward (step 302: YES), the ECU 16 sets an operation order that moves the seat back 3 rearward and then moves the headrest 4 frontward (step 303). If the ECU 16 does not move the headrest 4 frontward (step 302: NO), the ECU 16 does not set the operation order for the seat back 3 and the headrest 4 (step 304).

If the ECU 16 does not move the seat back 3 rearward (step 301: NO), the ECU 16 determines whether or not to move the seat back 3 frontward (step 305). If the ECU 16 moves the seat back 3 frontward (step 305: YES), the ECU 16 determines whether or not to move the headrest 4 rearward (step 306). If the ECU 16 moves the headrest 4 rearward (step 306: YES), the ECU 16 sets an operation order that moves the headrest 4 rearward and then moves the seat back 3 frontward (step 307). If the ECU 16 does not move the seat back 3 frontward (step 305: NO) or if the ECU 16 does not move the headrest 4 rearward (step 306: NO), the ECU 16 proceeds to step 304 and ends the determination process without setting the operation order.

A procedure for processing the operation order setting for the shoulder supports 3a and the headrest 4 will now be described.

Figure 8:
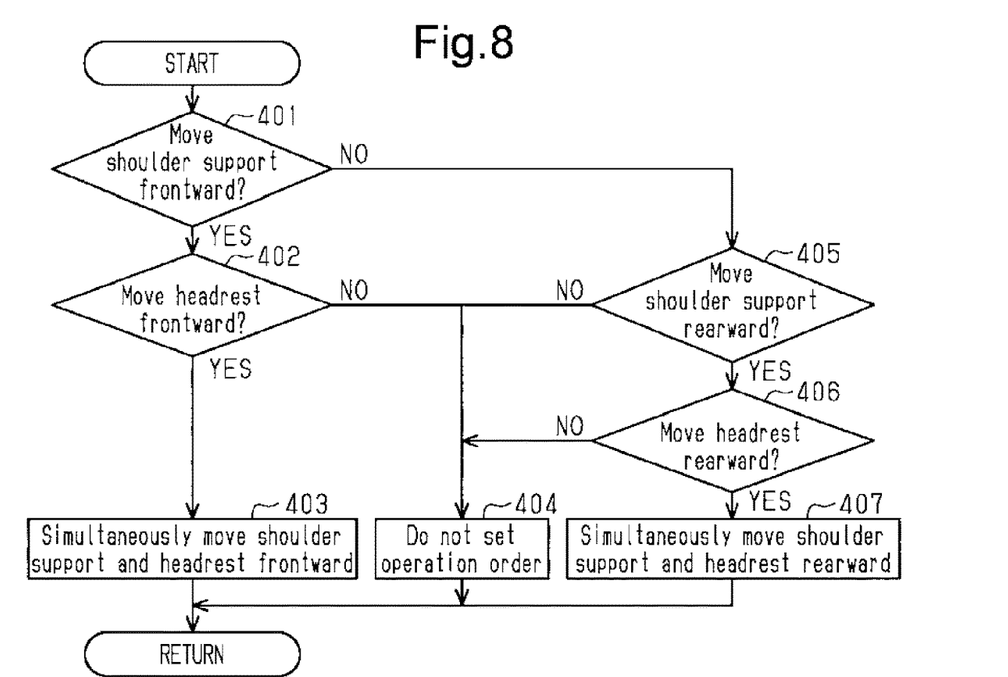
FIG. 8 is a flowchart showing a processing procedure for setting an operation order of the shoulder supports and the headrest.

As shown in FIG. 8, the ECU 16 determines whether or not to move the shoulder supports 3a frontward based on the operation directions of the seat elements determined in step 103 (step 401). If the ECU 16 moves the shoulder supports 3a frontward (step 401: YES), the ECU 16 determines whether or not to move the headrest 4 frontward (step 402). If the ECU 16 moves the headrest 4 frontward (step 402: YES), the ECU 16 sets an operation order that moves the shoulder supports 3a and the headrest 4 frontward at substantially the same time (step 403). If the ECU 16 does not move the headrest 4 frontward (step 402: NO), the ECU 16 does not set the operation order for the shoulder supports 3a and the headrest 4 (step 404).

If the ECU 16 does not move the shoulder supports 3a frontward (step 401: NO), the ECU 16 determines whether or not to move the shoulder supports 3a rearward (step 405). If the ECU 16 moves the shoulder supports 3a rearward (step 405: YES), the ECU 16 determines whether or not to move the headrest 4 rearward (step 406). If the ECU 16 moves the headrest 4 rearward (step 406: YES), the ECU 16 sets an operation order that moves the shoulder supports 3a and the headrest 4 rearward at substantially the same time (step 407). If the ECU 16 does not move the shoulder supports 3a rearward (step 405: NO) or if the ECU 16 does not move the headrest 4 rearward (step 406: NO), the ECU 16 proceeds to step 404 and ends the determination process without setting the operation order.

As described above, the present embodiment has the following advantages.

(1) When performing an automatic operation, the ECU 16 starts adjusting the positions of the seat elements that are moved into the seated vehicle occupant occupying region 31 at the point in time at which the predetermined conditions are satisfied after completing the position adjustment of the seat elements that are moved in a direction extending away from the seated vehicle occupant occupying region 31. Thus, the vehicle occupant is not forced into an uncomfortable posture that would be caused when the automatic operation moves seat elements in a direction extending into the seated vehicle occupant occupying region 31 before moving seat elements in a direction extending away from the seated vehicle occupant occupying region 31.

(2) When the ECU 16 adjusts the position of the seat back 3 frontward and the position of the seat cushion 2 downward, the ECU 16 starts adjusting the position of the seat back 3 frontward after completing the downward position adjustment of the seat cushion 2. Thus, when the automatic operation is performed, that is, during the process for adjusting the positions of the seat back 3 and the seat cushion 2 (FIG. 3B) from the seat position taken at the point in time at which the predetermined conditions are satisfied (FIG. 3A) to the predetermined position (FIG. 3C), situations are limited in which the upper body of the vehicle occupant is forced forward into an uncomfortable posture as compared with when the seat back 3 undergoes position adjustment before the seat cushion 2. Further, when the ECU 16 adjusts the position of the seat back 3 rearward and the position of the seat cushion 2 upward, the ECU 16 starts the upward position adjustment of the seat cushion 2 after completing the rearward position adjustment of the seat back 3. This also avoids a situation in which the upper body of the vehicle occupant is forced forward into an uncomfortable posture (FIGS. 3D to 3F).

(3) When the ECU 16 adjusts the position of the seat back 3 frontward and the position of the headrest 4 rearward, the ECU 16 starts adjusting the position of the seat back 3 frontward after completing the rearward position adjustment of the headrest 4. Thus, when the automatic operation is performed, that is, during the process for adjusting the positions of the seat back 3 and the head rest 4 (FIG. 4B) from the seat position taken at the point in time at which the predetermined conditions are satisfied (FIG. 4A) to the predetermined position (FIG. 4C), situations are limited in which the head of the vehicle occupant is forced forward into an uncomfortable posture as compared with when the seat back 3 undergoes position adjustment before the head rest 4. Further, when the ECU 16 adjusts the position of the seat back 3 rearward and the position of the headrest 4 frontward, the ECU 16 starts the frontward position adjustment of the headrest 4 after completing the rearward position adjustment of the seat back 3. This also avoids a situation in which the head of the vehicle occupant is forced forward into an uncomfortable posture (FIGS. 4D to 4F).

(4) When the ECU 16 adjusts the positions of the shoulder supports 3a frontward and the position of the headrest 4 frontward, the ECU 16 starts adjusting the positions of the shoulder supports 3a and the headrest 4 at substantially the same time. Thus, when the automatic operation is performed, that is, during the process for adjusting the shoulder supports 3a and the headrest 4 from the seat position taken at the point in time at which the predetermined conditions are satisfied (FIG. 5A) to the predetermined position (FIG. 5B), a support state for the vehicle occupant provided by the shoulder supports 3a and the headrest 4 remains substantially the same and situations are limited in which the shoulders to around the head of the vehicle occupant are forced into an uncomfortable posture. Further, when the ECU 16 adjusts the positions of the shoulder supports 3a rearward and the position of the headrest 4 rearward, the ECU 16 starts the rearward position adjustment of the shoulder supports 3a and the headrest 4 at substantially the same time. This also avoids a situation in which the shoulders to around the head of the vehicle occupant are forced into an uncomfortable posture in the same manner (FIGS. 5C and 5D).

The embodiment may be modified as described below.

In the above embodiment, when the ECU 16 adjusts the position of the seat back 3 frontward and the position of the seat cushion 2 downward, the ECU 16 starts the frontward position adjustment of the seat back 3 after completing the downward position adjustment of the seat cushion 2. Instead, the ECU 16 may start the frontward position adjustment of the seat back 3 during the downward position adjustment of the seat cushion 2. Further, the ECU 16 may start the downward position adjustment of the seat cushion 2 and the frontward position adjustment of the seat back at substantially the same time. When the ECU 16 adjusts the position of the seat back 3 rearward and the position of the seat cushion 2 upward, the ECU 16 does not need to start the upward position adjustment of the seat cushion 2 after completing the rearward position adjustment of the seat back 3. In other words, the position adjustment of the seat elements moved in a direction extending into the seated vehicle occupant occupying region 31 may start simultaneously with or after starting the position adjustment of the seat elements moved in a direction extending away from the seated vehicle occupant occupying region 31. This also avoids a situation in which the upper body of the vehicle occupant is forced forward into an uncomfortable position when the automatic operation is performed.

In the above embodiment, when the ECU 16 adjusts the position of the seat back 3 frontward and the position of the headrest 4 rearward, the ECU 16 starts the frontward position adjustment of the seat back 3 after completing the rearward position adjustment of the headrest 4. Instead, the ECU 16 may start the frontward position adjustment of the seat back 3 during the rearward position adjustment of the headrest 4. Further, the ECU 16 may start the frontward position adjustment of the seat back 3 and the rearward position adjustment of the headrest 4 at substantially the same time. When the ECU 16 adjusts the position of the seat back 3 rearward and the position of the headrest 4 frontward, the ECU 16 does not need to start the frontward position adjustment of the headrest 4 after completing the rearward position adjustment of the seat back 3. This also avoids a situation in which the head of the vehicle occupant is forced forward into an uncomfortable position when the automatic operation is performed.

In the above embodiment, when the ECU 16 adjusts the positions of the shoulder supports 3a frontward and the position of the headrest 4 frontward, the ECU 16 starts the frontward position adjustment of the shoulder supports 3a and the headrest 4 at substantially the same time. Instead, the ECU 16 may start the frontward position adjustment of the shoulder supports 3a and then start the frontward position adjustment of the headrest 4 during the frontward position adjustment of the shoulder supports 3a. Further, when the ECU 16 adjusts the positions of the shoulder supports 3a rearward and the position of the headrest 4 rearward, the ECU 16 may start the rearward position adjustment of the shoulder supports 3a and then start the rearward position adjustment of the headrest 4 during the rearward position adjustment of the shoulder supports 3a. This also avoids a situation in which the shoulders to around the head of the vehicle occupant are forced into an uncomfortable position when the automatic operation is performed.

In the above embodiment, the seat 1 is configured as a seat that can adjust the tilting position of the seat cushion 2, the reclining position of the seat back 3, the front-rear position of the shoulder supports 3a, and the front-rear position of the headrest 4. However, the seat 1 does not need to include all of these seat elements SE and may include only some of these seat elements SE or other seat elements SE. Examples of the other seat elements SE include a seat cushion, of which position (lift position, namely, vertical direction position) can be adjusted through a lift operation including movement in the vehicle vertical direction, and a pelvic portion, which corresponds to a lumbar portion of the seat back 3 and of which position (front-rear position) can be adjusted through a front-rear operation including movement in the vehicle front-rear direction. In this case, the position adjustment of the seat elements moved in a direction extending into the seated vehicle occupant occupying region 31, which is defined at the point in time at which the predetermined conditions are satisfied, is preferably performed simultaneously with or after starting the position adjustment of the seat elements moved in a direction extending away from the seated vehicle occupant occupying region 31. This avoids a situation in which the vehicle occupant is forced into an uncomfortable posture by the seat elements moved in a direction extending into the seated vehicle occupant occupying region 31 before the seat elements moved in a direction extending away from the seated vehicle occupant occupying region 31 when the automatic operation is performed.

In the above embodiment, the order of setting the operation order for the seat elements SE shown in step 104 in FIG. 2 may be changed when necessary. In other words, the order of steps 104a to 104c may be changed when necessary. The determination procedure in the flowcharts in FIGS. 6 to 8 may also be changed when necessary.

In the above embodiment, the actuators 11 to 15 include the motors M1 to M5 serving as driving sources. Instead, the configurations of the actuators 11 to 15 may be changed when necessary as long as the positions of corresponding seat elements can be adjusted. For example, each shoulder support actuator 14 may include an air bag embedded in the seat back 3 and may adjust the positions of the shoulder supports 3a in the front-rear direction with the amount of air fed into the air bag. In this case, the ECU 16 may detect the front-rear positions of the shoulder supports 3a based on the pressure of the air bag.

In the above embodiment, the ECU 16 detects the positions of the seat elements SE based on the pulse signals Sp1 to Sp5. Instead, for example, the positions may be directly detected by a movement sensor arranged in the seat elements SE. Further, the method for detecting positions may be changed as required.

The invention claimed is:

1. A vehicle seat controller comprising:
circuitry configured to:
store a predetermined seat position that is a position of a seat set in advance;
detect positions of a plurality of seat elements of which positions are adjusted by a driving force from a driving source;
perform an automatic operation to automatically adjust the position of each of the plurality of seat elements so that each of the plurality of seat elements is moved to a position corresponding to the predetermined seat position when predetermined conditions are satisfied; and
set an operation order for the plurality of seat elements in a case where the circuitry adjusts the positions of the plurality of seat elements in the automatic operation,
wherein a region on the seat occupied by a vehicle occupant seated on the seat is referred to as a seated vehicle occupant occupying region, and
wherein the circuitry is configured to set the operation order based on whether the plurality of seat elements are respectively configured to move in a direction extending into the seated vehicle occupant occupying region or in a direction extending away from the seated vehicle occupant occupying region so that position adjustment of one of the plurality of seat elements moved in a direction extending into the seated vehicle occupant occupying region always starts simultaneously with or after position adjustment of one of the plurality of seat elements moved in a direction extending away from the seated vehicle occupant occupying region when the automatic operation is performed.

2. The vehicle seat controller according to claim 1, wherein:
the plurality of seat elements include a seat cushion, of which position is adjusted through a tilting operation including movement in a vehicle vertical direction, and a seat back, of which position is adjusted through a reclining operation including movement in a vehicle front-rear direction;
the circuitry is configured to set the operation order when the circuitry adjusts the position of the seat back in a frontward direction and the position of the seat cushion in a downward direction so that position adjustment of the seat back in the frontward direction starts simultaneously with or after starting position adjustment of the seat cushion in the downward direction; and
the circuitry is configured to set the operation order when the circuitry adjusts the position of the seat back in a rearward direction and the position of the seat cushion in an upward direction so that position adjustment of the seat cushion in the upward direction starts simultaneously with or after starting position adjustment of the seat back in the rearward direction.

3. The vehicle seat controller according to claim 2, wherein:
when adjusting the position of the seat back in the frontward direction and the position of the seat cushion in the downward direction, the circuitry is configured to start position adjustment of the seat back in the frontward direction after completing position adjustment of the seat cushion in the downward direction; and
when adjusting the position of the seat back in the rearward direction and the position of the seat cushion in the upward direction, the circuitry is configured to start position adjustment of the seat cushion in the upward direction after completing position adjustment of the seat back in the rearward direction.

4. The vehicle seat controller according to claim 1, wherein:
the plurality of seat elements include a seat back, of which position is adjusted through a reclining operation including movement in a vehicle front-rear direction, and a headrest, of which position is adjusted through a front-rear operation including movement in the vehicle front-rear direction;
when the circuitry adjusts the position of the seat back in a frontward direction and the position of the headrest in a rearward direction, the circuitry is configured to set the operation order so that position adjustment of the seat back in the frontward direction starts simultaneously with or after starting position adjustment of the headrest in the rearward direction; and
when the circuitry adjusts the position of the seat back in the rearward direction and the position of the headrest in the frontward direction, the circuitry is configured to set the operation order so that position adjustment of the headrest in the frontward direction starts simultaneously with or after starting position adjustment of the seat back in the rearward direction.

5. The vehicle seat controller according to claim 4, wherein:
when adjusting the position of the seat back in the frontward direction and the position of the headrest in the rearward direction, the circuitry is configured to start position adjustment of the seat back in the frontward direction after completing position adjustment of the headrest in the rearward direction; and
when adjusting the position of the seat back in the rearward direction and the position of the headrest in the frontward direction, the circuitry is configured to start position adjustment of the headrest in the frontward direction after completing position adjustment of the seat back in the rearward direction.

6. The vehicle seat controller according to claim 1, wherein:
the plurality of seat elements include a shoulder support, which is arranged at a shoulder portion of a seat back and of which position is adjusted through a front-rear operation including movement in a vehicle front-rear direction, and a headrest, of which position is adjusted through a front-rear operation including movement in the vehicle front-rear direction;
when the circuitry adjusts the position of the shoulder support in a frontward direction and the position of the headrest in the frontward direction, the circuitry is configured to set the operation order so that position adjustment of the headrest in the frontward direction starts simultaneously with or after starting position adjustment of the shoulder support in the frontward direction; and
when the circuitry adjusts the position of the shoulder support in a rearward direction and the position of the headrest in the rearward direction, the circuitry is configured to set the operation order so that position adjustment of the shoulder support in the rearward direction starts simultaneously with or after starting position adjustment of the headrest in the rearward direction.

7. The vehicle seat controller according to claim 6, wherein:
when adjusting the position of the shoulder support in the frontward direction and the position of the headrest in the frontward direction, the circuitry is configured to simultaneously start position adjustment of the shoulder support and the headrest in the frontward direction; and
when adjusting the position of the shoulder support in the rearward direction and the position of the headrest in the rearward direction, the circuitry is configured to simultaneously start position adjustment of the shoulder support and the headrest in the rearward direction.

* * * * *